United States Patent Office 3,846,261
Patented Nov. 5, 1974

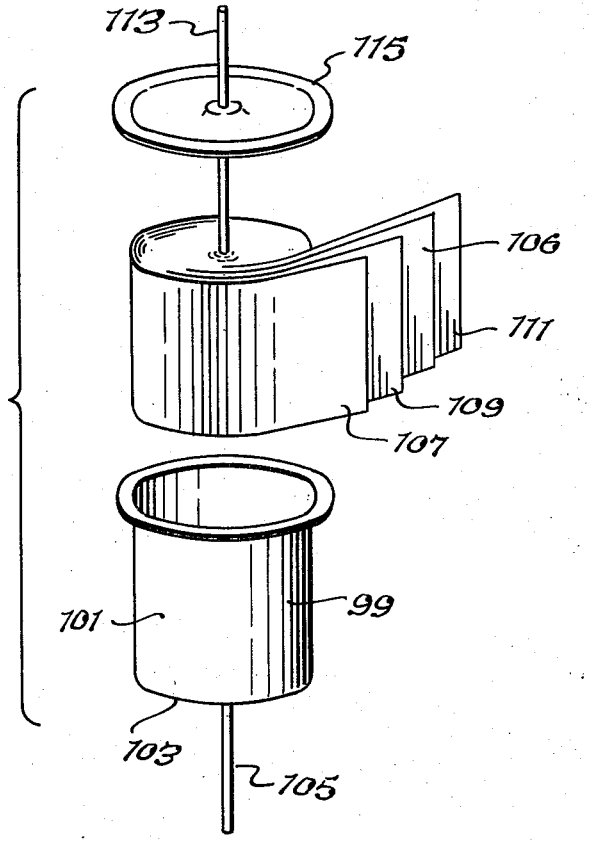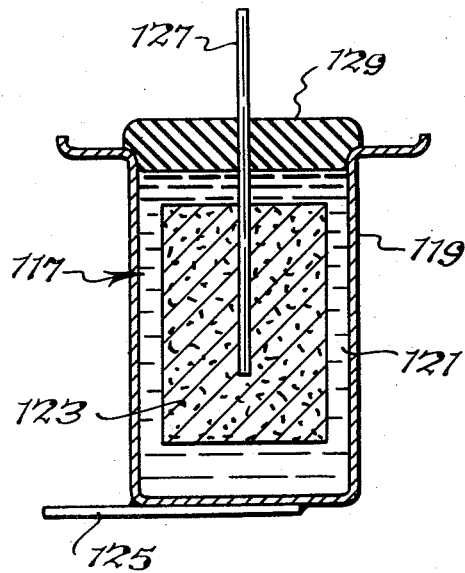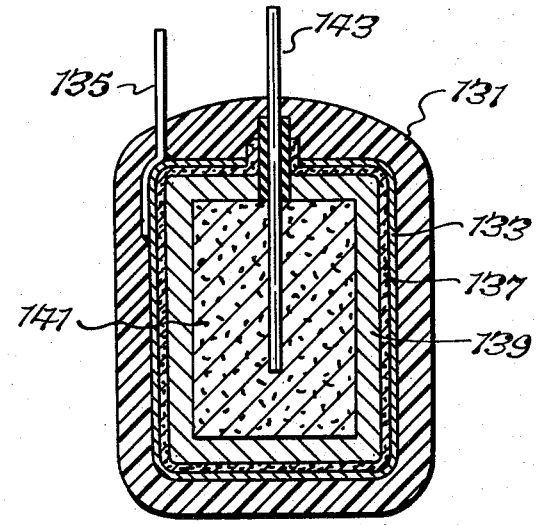

3,846,261
ANODIZING OF METALS
Karl Moeglich, Williamsville, N.Y., assignor to D. A. Hughes Affiliates, Inc., Buffalo, N.Y.
Filed Sept. 6, 1972, Ser. No. 286,766
Int. Cl. C23b 9/02, 11/02; C23f 23/00
U.S. Cl. 204—56 R
23 Claims

ABSTRACT OF THE DISCLOSURE

Aluminum and other valve metals are anodized in dilute aqueous electrolyte baths and during anodizing the polarity of the workpiece is reversed about 10 to 130 times per minute. The oxide coatings formed on the metals are of improved properties, compared to such oxides formed by conventional anodizing techniques. Capacitors made of metals coated with barrier oxides by the described method have improved electrical properties.

Also disclosed are formation electrolytes for the anodizing of metals, methods of manufacture thereof, apparatuses for carrying out such anodizing operations, anodized metals produced and improved capacitors made from such anodized metals.

---

This invention relates to anodizing metals to produce oxide coatings thereon. More particularly, it is of an anodizing method wherein an electric current is passed through one or more metal workpieces in a liquid electrolyte and the direction of the current is reversed periodically, within the range of 10 to 130 times per minute, to produce excellent, improved oxide coatings. The invention also relates to preferred low conductivity formation electrolytes for aluminum, a method for the manufacture thereof, oxide-on-metal products, apparatuses for the manufacture thereof and capacitors including metal foils, slugs, etc., so coated with such oxides.

Electric capacitors comprising positive and negative conductors separated by a dielectric are vital constituents of many electronic circuits. Accordingly, they have been manufactured in large quantities and much attention has been paid to improving their characteristics and decreasing production costs. Such capacitors have been made by electrolyzing or anodizing an oxide coating onto aluminum or tantalum, rolling up foils of such metals and such with the corresponding oxides, with electrolyte-impregnated paper or other dielectric between, and sealing the rolls in "cans" with positive and negative connections attached to or contacting the foils. Instead of foils, slugs or other forms of metals may also be used. Methods for the manufacture of the anodized metals have included anodizing in formation electrolytes, which include boric acid for aluminum and phosphoric or propionic acid for tantalum, etc., and utilizing direct current with less than 3% ripple. Alternating current (60 Hz.) and direct current with more than 3% ripple have been tried but are not used commercially, at least partly because of accompanying dissolvings of the cathodes. Reversing the direction of direct current flow after a comparatively long period of time, e.g., daily, and utilizing ethylene glycol borate as a fill electrolyte (that which is present in the final condenser) are known. Also, it has been known to produce anodized metal foils automatically, using feeds of one or more foil sheets which are made anodes, and a cathodic wall for the electrolyte container or fixed cathode(s). Such methods, compositions and aparatuses have been useful but there has been an increasing demand for higher quality oxide coatings, formation electrolytes with higher breakdown (scintillation) voltages at lower specific resistivities, more compact condensers made from anodized foils, superior electrical properties for condensers and more efficient aparatuses for producing the anodized foils. Such requirements have been answered, at least in large part, by the present invention, which allows the economic and automatic production of effectively anodized metal foils, slugs, chips, thin films, etc., which are useful in making capacitors of smaller dimensions and superior electrical properties.

In accordance with the present invention a method of anodizing a metal comprises passing an essentially direct electric current through such metal while it is an anode in a liquid electrolyte and reversing the direction of such current flow from 10 to 130 times per minute. In preferred embodiments of the invention the metal electrodes are both anodized and are of aluminum or other valve metals and narrower ranges of current reversal frequencies are employed. Also, ripple currents on the direct current, over 3% and up to 30% ripple, e.g., 5 to 20% ripple, are sometimes utilized and particular electrolytes are employed which result in superior properties of the oxides formed and of capacitors made from such anodized metals. The scintillation voltage of a given electrolyte is increased by the proper use of this invention. Various other aspects of the process, electrolytes, methods of making the electrolytes, apparatuses for producing the anodized metals, the anodized metals and capacitors including them are also within the invention.

The metals employed include aluminum and other valve metals, such as tantalum, titanium and niobium. The term "valve metal" refers to those metals whose oxides have some rectification abilities and high dielectric constants. Although the invention is operative with other metals, it is contemplated that for use in electrical capacitors or condensers only valve metals will normally be utilized. Accordingly, throughout the rest of this specification most exemplifications will be given based on aluminum and tantalum although it should be understood that similar processes may be employed utilizing the other metals mentioned and some examples of such other metals are included. By this invention titanium has been successfully anodized so as to be useful as electrodes for low voltage capacitors. Additionally, niobium can also be anodized by this method, for use in capacitors.

Although the metals to be anodized may be of various shapes and forms, for the most common employment thereof as capacitor parts they will normally be foils, slugs or chips. Vapor deposited, plasma deposited, plated and sputtered thin metal films and equivalents made by other processes may also be anodized by our method. The foils will usually have a thickness of about 0.0004 to 0.005 inch; aluminum foils are usually about 0.003 inch thick and those of tantalum are about 0.0005 inch in thickness. Tantalum and niobium sintered slugs (cylindrical) and chips (rectangular) are of various sizes common in the art, as indicated by various manufacturers' catalogs. However, foils and slugs can be formed thinner and thicker, measurements from 0.020 to 0.3 inch in diameter, width or thickness being practicable.

The employment of alloys of the metals described or such metals containing impurities is within the invention but it is generally preferred that the metals used be as pure as possible, or at least as pure as those used new for the same end purpose. Impurities can cause altering of the process conditions to obtain best results for the end product and such adjustments to process conditions are usually determined empirically for anodization processes. Purity may often be important to the obtaining of the most satisfactory continuous, uniform oxide films. However, aluminum of a purity less than the conventional 99.99%, say 99.8%, can be anodized properly with only slight changes in the process, and stainless steel can be oxidized or otherwise affected by the present treatments to produce a variety of desired colors selectively thereon.

By the present method all commercially available capacitor materials and titanium have been anodized but the invention also has broader aspects, being applicable also to some other metals and various alloys.

The electrolyte employed may be any of the known suitable formation electrolytes utilized to produce oxide coatings anodically on the described metals but modified if necessary so that the specific resistivity thereof is below 500 ohm-cm., preferably under 100 ohm-cm., and the pH is adjusted as described hereafter to help to obtain such result. Such base formation electrolytes are well known in the patent art, and are described in many patents, including British 439,531; and U.S. 1,963,049; 2,096,774; 2,901,412; and 2,920,018. Aqueous electrolytes, such as solutions of phosphoric acid, propionic acid, sulfuric acid, oxalic acid and boric acid, and various salts thereof, usually ammonium or alkali metal salts, have been employed, e.g., borax, depending on the parent metal and on the end use of the anodized metal. It has been found that formation electrolytes of low resistivity and reasonably high scintillation voltages can be formulated, and these are preferred. Moreover, for a given formation electrolyte, polarity reversal per se increases the effective scintillation voltage by about 5 to 18%, providing, that the reversal frequency is as described herein.

One highly preferred electrolyte for the formation of the dielectric oxide film on aluminum is an unexpected modification of one which has been described as a fill electrolyte, as in British patent, 439,531. The preferred electrolyte comprises sources of boric acid or suitable borate, polyhydric alcohol, preferably ethylene glycol, and ammonia, e.g., aqueous ammonium hydroxide. Unlike the electrolyte of the mentioned British patent, the present electrolytes are dilute aqueous electrolytes, usually of a 2–4% concentration in water, of a viscosity of 1 to 5 centipoises, preferably of 1 to 2.5 centipoises, and of a specific resistivity of less than 100 ohm-cm. They contain no additional materials such as thickening agents or gums, which may interfere with the formation of the optimum oxide film on the metal surface. For tantalum anodizing a dilute propionic acid electrolyte may be used successfully and is quite beneficial, not only during formation, but also because its use simplifies subsequent cleansing steps. While it is possible to use prior art electrolytes, together with the "current reversal" anodizing process of the present invention and obtain some improved results due to the current reversal, such as improved scintillation voltage, significantly better results are obtainable when the mentioned preferred electrolyte is employed for aluminum and when propionic acid is used for tantalum. Whereas prior art electrolytes may have specific resistivities outside the present preferred ranges, better results are obtained when the present electrolytes are utilized and the specific resistivities are low. pH's are in the 3 to 9 range, more preferably 4 to 8.5. The lower pH's 3–5, are obtainable from acids and higher ones, 5–8.5, by reacting boric acid, ethylene glycol and ammonium hydroxide, heating and diluting. To modify the pH of the electrolyte for aluminum the proportion of ammonia or $H_3BO_3$ employed may be changed.

To manufacture the preferred electrolytes for aluminum chloride-free, reagent grade ethylene glycol is normally employed and chemically pure boric acid crystals are used. The ammonium hydroxide is normally an aqueous solution, e.g., 15 to 30% in water, more frequently 20 to 28%, and for the purpose of this invention, 25% ammonium hydroxide has been employed. The more useful molar proportions of the polyhydric alcohol (ethylene glycol) and the source of borate ion, (boric acid) are from 1.5 to 1.9, preferably about 1.6 to 1.7. Outside the broader range mentioned it is found that electrical and mechanical properties of the oxide film produced on the metal are impaired. Thus, leakage current and rated voltage of capacitors made from such coated metal foils are poorer. The proportion of ammonium hydroxide solution used, normally from 10 to 30% of the weight of the other constituents (employing a 15 to 30% aqueous ammonium hydroxide), will usually be such as to provide 2 to 10% $NH_4OH$ and maintain the pH of the electrolyte, during formation of the oxide film on the metal, in the range of 4 to 8.5.

To make the present formation electrolyte for aluminum the boric acid and ethylene glycol or other suitable substitute materials are admixed at room temperature, with stirring, and the ammonium hydroxide is added slowly, with stirring. However, order of addition and mixing times are not critical. After completion of ammonium hydroxide solution addition the mix is heated slowly, for from 15 minutes to 2 hours, to a temperature of about 105–106° C., at which boiling occurs, and is then heated for an additional 5 to 60 minutes at an increasingly elevated temperature, normally over 150° C. and less than 200° C., at which desired curing to the right pH producing product is effected. The product made, ethylene glycol borate, is then diluted with distilled or deionized water (chloride-free). The pH of the dilute electrolyte made should be in the range of about 4 to 8.5. It may be adjusted, as desired, usually by the addition of boric acid or $NH_4OH$, depending on the material to be anodized.

The dilute solution of the ethylene glycol borate, at a concentration of 1 to 10% in water, preferably 1 to 4% and often about 2.5% to 3.5%, and at a pH in the range of 4 to 8.5, is especially useful in forming an excellent oxide coating on the aluminum to be anodized. Although especially useful when "current reversal" operations of this invention are effected, the mentioned electrolyte, made as described, may also be employed in other anodizing procedures than that of this invention and is found to be superior to conventional formation electrolytes such as those based on aqueous solutions of boric acid and borax. Even though such dilute solution may have a resistivity of only 40 ohm-cm., its breakdown voltage is reasonably high, e.g., 390 volts, and higher of course with polarity reversal, e.g., 440 volts.

When one of the described metals is anodized by passing an electric current through it in a proper liquid electrolyte it is found that substantial power savings result when anodizing and higher capacitances can be produced in an electric condenser made from the anodized material, compared to conventional procedures and products made with them, if an essentially direct current, preferably a rippled current, is utilized with current reversals in a particular range. Specifically, the improvement results when the current reversals are from 10 to 130 times per minute. Because two current reversals make one cycle the preferred reversal frequency may be expressed as 0.08 to 1.08 Hertz. By following the described current reversal anodizing procedure for aluminum the formation time to produce the oxide coating can be reduced to about half that required when following conventional methods. Power costs are reduced when any metal is anodized by the described method.

Within the described range of current reversals, to obtain best operating and product characteristics the periodicity may be altered, depending in part on the electrical constants of the formation system, e.g., power supply and formation machine capacitance, resistance, inductance; the resistivity of the electrolyte; the current density during formation; and the pH and corrosiveness of the electrolyte and its ability to remove bound water at electrode interfacial films. Nevertheless, one of skill in the art will, with the present teaching before him, be able to adjust the reversals for optimum effects and such adjustments may sometimes be made essentially on an empirical basis. It should be evident that all such adjustments are to be considered within the scope of these teachings. Thus, it is possible, although not preferred, to operate above 130 reversals per minute (but not above 180 reversals per minute) by making other adjustments to the system, e.g., raising the applied voltage.

The normal manufacturing methods by which capacitor parts or other materials are anodized include immersing the metal in a forming electrolyte bath and causing direct current to flow between the metal anode and a standard electrode. In following such procedures, the terminal voltage applied is usually about 20% higher than the surge voltage rating desired for a capacitor to be made from an anode formed in such matter; this is normally to allow for inefficiencies of the process, because much of the current serves only to electrolyze water and heat the electrolyte. In the usual continuous operation, wherein a foil anode is passed through an electrolyte bath and is removed as an anodized product, when the foil first enters the electrolyte the current flow is high and the effective formation voltage is low but as barrier oxide is formed and current flow is thus reduced, the effective voltage of formation increases. Then, after it is at about applied voltage, formation is continued for an additional half-hour to two hours or sometimes longer. The time before the formation voltage is essentially the same as the applied voltage is known as the "up formation" period, during which effective voltage is increasing (local current decreasing) and the remainder of the formation time is known as "down formation," in which current flow gradually declines. The standard continuous process of anodizing aluminum foil for use in making capacitors requires about 3 to 5 minutes of up formation and 45 to 60 minutes of down formation, with the electrolyte generally being at 85 to 100° C.

Utilizing the method of the present invention, metal foils such as aluminum or tantalum foil or other tantalum shapes onto which the oxide coatings are anodized, produce improved capacitors, having higher capacitances per case size, lesser leakage currents and lower series resistances than similar capacitors made by the prior art methods. The explanation for these improved effects is not entirely clear. It would appear that current reversal, which makes the aluminum or tantalum a cathode for a part of the electrolysis process, would have the effect of either preventing oxide formation or causing the generation of hydrogen ion to attack the metal. It would be expected that this would result in pits and weak spots in the metal and indeed, this can happen when non-oxidized metal or metal uncoated with any protective oxide is maintained as a cathode for longer periods of time than those of the present invention. Yet, using the present method, polarity reversal produces an improved oxide coating on the metal which has better electrical properties; allows the use of aluminum or other metal as both anode and cathode; requires less power per square inch of anode formed; and decreases the total formation time per square inch of anode formed to about half of normal with ordinary direct current, for aluminum. The coatings made are considered to be mechanically stronger, more pure and dense, more adherent and of fewer imperfections, as evidenced by a higher capacitance, a lower leakage current, and sometimes a different color. Moreover, the ratio of the formation voltage to the working and surge voltage of a final capacitor made from such anodized metal can be closer to unity.

The preferred periods in which the electrodes are maintained positive or negative will be about equal. In other words, a particular electrode will be an anode about 40 to 60% of the time and then will be changed to a cathode and the cycle will be repeated. Total anodizing time is from ½ to 2 hours, normally.

An additional improvement in the process with essentially pure metal is found to result when an essentially D.C. voltage having more than 3% and less than 30% ripple is impressed between the electrodes. The amplitude of the ripple with respect to the D.C. voltage will preferably be from 5 to 20% of the corresponding average direct voltage employed (not including the reversal, which could make the average 0). Half-wave rectification without smoothing is preferred for many applications and may represent an additional saving for new installations.

Employment of current reversal, ripple voltage and the described preferred low resistivity formation electrolyte for aluminum all aid in improving the manufacture of anodized surfaces. For example, polarity reversal reduces power consumption by about 30 to 50% in any low conductivity aqueous electrolyte, e.g., ammonium glycol borate for aluminum and propionic acid for tantalum. Additionally, the anode foil made shows improved capacitance, being about 10 to 50% higher. When ripple voltages are also used, additional improvements are observable in both the capacitance of the coated metal, e.g., aluminum foil, and the reduction in power consumption. The combination or parts thereof usually reduce leakage current; for example leakage currents on formed aluminum foil can approach leakage currents of tantalum foil capacitors. Leakage currents of tantalum foil capacitors can be reduced by about a factor of 3, even at reduced formation times.

In the manufacture of anodized metals, e.g., aluminum and tantalum foils or other shapes, a pair or pairs of metal pieces are fed to a commercial electrolyte bath, which bath is usually about 30 or more feet long, at such a speed as to give them the desired anodizing time and final anodized characteristics, or are alternately placed therein batchwise and held for the anodizing period. Pairs of strips may be parallel to each other, side-by-side or one atop the other, with the side-by-side configuration being preferred for machine simplification for foil processing. The concentration of the aqueous electrolyte employed is from 1 to 15%, the resistivity being below 500 ohm-cm., and for aluminum the preferred electrolyte is usually at about 2 to 5% concentration in water, with the pH being from 4 to 8.5. The temperature is variable but often will be 70 to 100° C. The voltage applied is about 10 to 600 volts, depending on the metal and the end use for the anodized product. Anodizing time is usually less than 60 minutes for aluminum or titanium, to a leakage current of considerably less than now obtained by the industry in twice this time. For niobium or titanium, comparable results are obtained but no industry standards are known. The thickness of the barrier oxide formed is a function of the effective voltage and temperature at formation, as is known to the art, e.g., 1.05 millimicrons/volt for aluminum at room temperature.

The oxide coatings made by the described process of the present invention are such that the capacitance of the condenser made from such foils is greater and a higher capacitance condenser with a much lower leakage current may be made of a smaller size, due to the nature of the oxide coatings. It is considered that the method of the present invention causes the removal of some original "air oxide" of aluminum or other metal, or co-produced non-barrier oxide (which may be amorphous), hydroxide, hydrate or water from the surface of the metal being anodized and thus allows replacement thereof with the preferred barrier oxide lattice coating, thereby causing the final oxide to possess a higher dielectric constant and less leakage. Also, such oxides appear to be less susceptible to cracking, perhaps because of their thinness, and therefore, during rolling or shaping to form manufactured parts therefrom, such as capacitors, there is less danger of the barrier oxide becoming micro-cracked and causing electrical failure on subsequent aging to voltage.

When the anodized foil is utilized in making capacitors it is usually rolled with an etched foil cathode, or for bipolar capacitors with another anode foil, and with absorbent paper strips, the rolls are placed in containers, electrical leads are attached to the ends of the capacitor, and the containers are then filled with a fill electrolyte. The various steps follow conventional poduction methods. After filling of the capacitors and sealing thereof, they are aged to terminal voltage by conventional methods. Aluminum electrolytic capacitors made by this invention age to a proper leakage current in about half the time needed for those capacitors made from conventional anode foils. As is evident, this speeds the manufacturing process and helps to reduce the cost of the product.

The various apparatuses utilized for making the present anodized metals may be the same as or adapted from those currently employed for such purpose in conventional manufacturing methods. In one embodiment of the invention the material to be anodized, preferably in sheet or strip form, may be drawn through an electrolyte bath while an electrical potential with polarity reversal is communicated to it and a cathode near the moving strip is held at the desired opposite potential. However, such method consumes the cathode, which has to be periodically replaced, and it also wastes half of the electrical power. If the conventional cathode is eliminated and a pair or pairs of foil strips are employed, with current reversal, the loss of metal by dissolution at the cathode is avoided and good oxide films are produced on both foils. In the usual operation of this type the foils or sheets of metal will be passed through the electrolyte in pairs, with one atop or alongside the other and out of contact with it except through the electrolyte. Such a method produces a satisfactory product but abnormally wide sheets of such product are not preferred because of the longer electrical paths through the electrolyte. If the foils are pre-slit to the desired widths they may enter the electrolyte bath in a side-by-side coplanar relationship, separated by electrolyte and having the foils alternately anodes and cathodes across the width of the electrolyte tank. The mentioned methods may be adapted to use with slugs (on racks) or other shapes, for continuous or batch processes.

The apparatus and structural aspects of the present invention may be better understood by reference to the following drawing, taken in conjunction with the specification, in which drawing:

FIG. 3 is a partially disassembled view of a finished capacitor made using metal foil anodized by a process of this invention;

FIG. 4 is a central vertical section of a capacitor which comprises a sintered anode slug anodized according to the present method; and FIG. 5 is a vertical sectional view of an encapsulated capacitor in which the anode chip is anodized by the present process.

Figure 1:
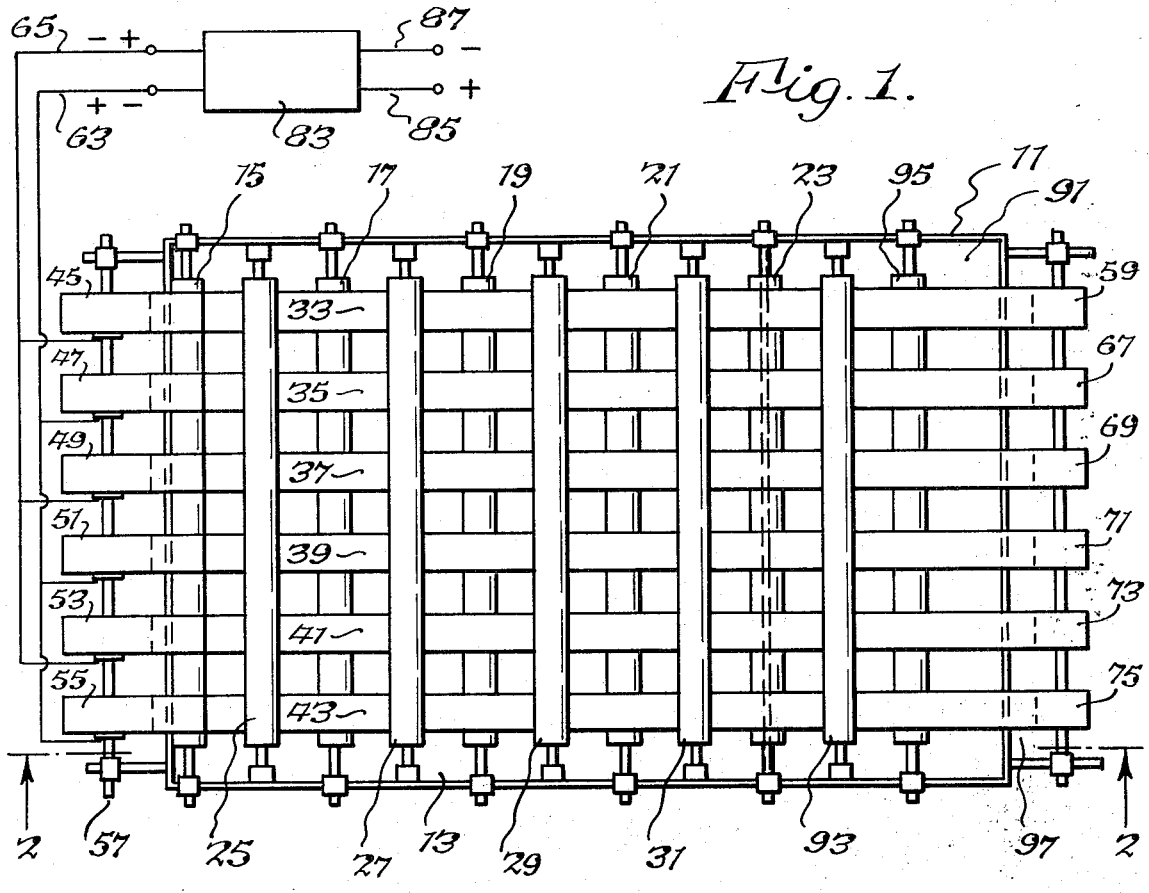
FIG. 1 is a top plan view of three pairs of alternating anodes and cathodes passing through an electrolyte bath wherein they are subjected to current reversal by a process of this invention.
Figure 2:
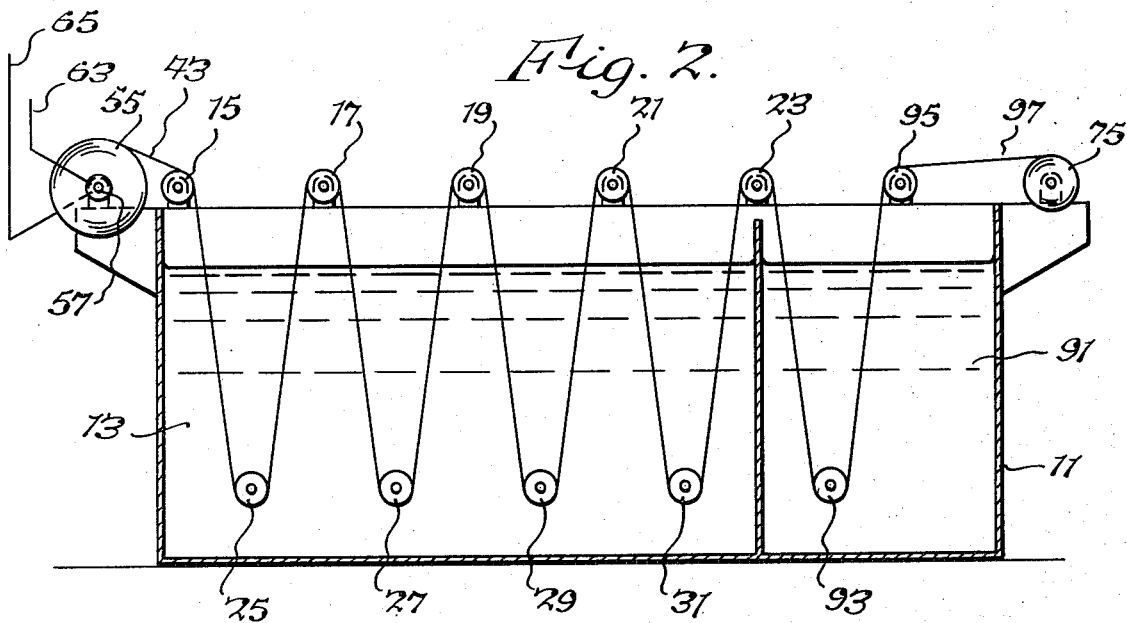
FIG. 2 is a vertical sectional view of the apparatus of FIG. 1, taken along plane 2—2.

In FIGS. 1 and 2 container or tank 11 holds electrolyte 13, through which upper insulated rollers 15, 17, 19, 21 and 23 and lower insulated rollers 25, 27, 29, and 31 shape the path along which foil strips 33, 35, 37, 39, 41 and 43 pass through the electrolyte. It is seen that the foil is fed from six separate continuous rolls 45, 47, 49, 51, 53 and 55, which are on a common insulated shaft 57, so as to avoid short-circuiting. The foil strips are fed over and under the previously mentioned rollers and when anodizing is complete, after rinsing, they are taken up on insulated winding rolls 59, 67, 69, 71, 73 and 75 from which the anodized foil may be removed for rolling into capacitors. Electrical conductors 63 and 65 communicate strips 35, 39 and 43 and 33, 37 and 41 respectively, to mechanical or electrical reversing means 83, which is communicated by lines 85 and 87 to positive and negative connections to a source of direct current, not illustrated. The reversal of current is effected every 1/30 to 1/10 minute, thereby changing anode strips to cathodes and vice versa.

As illustrated, the foil moves into and out of the anodizing bath but it may be moved directly through the bath horizontally, completely submerged or may be moved upwardly and downwardly, as indicated, without exiting from the bath. However, it is preferred to have it removed from the bath periodically and it appears that the oxide coating is improved by such exposure.

As shown in the drawing, the anodized strips are carried through a wash zone 91 under roll 93 and over roll 95 so that the electrolyte is rinsed off and the strips are dried at 97 by heating or air circulating means, not shown, so that the foil rolled up is dry.

In FIG. 3 the capacitor includes a can or container 99 having a wall 101 and a bottom 103 with a cathode lead 105 centrally affixed to the bottom. The can contains either wet or dry electrolyte and rolled-up anode 106 and cathode 107 separated from other such cathode and anode surfaces by dielectrics 109 and 111. An anode lead 113 is centrally positioned through the capacitor top 115 and is connected to anode 106 at a central portion thereof. The top is sealed to the can by crimping or other suitable means.

In FIG. 4 capacitor 117 including a silver can 119 containing a fill electrolyte 121, usually lithium chloride, and an anodized sintered anode slug 123. A cathode lead 125 is affixed to the can and anode lead 127, centered in position by top 129 is affixed to anode 123. The cap is held in tight relationship with the rest of the condenser by sealing means, not specifically illustrated.

In FIG. 5 epoxy resin polymeric plastic material 131 surrounds and encapsulates the condenser parts, which include a conductive layer, such as silver, which is the cathode 133 and to which cathode lead 135 is attached. Inside the cathode layer is a graphite coating 137, a dry electrolyte 139, often manganese dioxide, and anode 141, communicated with centered anode lead 143. The anode, which may be a suitable valve metal, has a porous base, such as a sintered material powder which, after anodizing by the method of this invention, is dipped into an aqueous manganese nitrate solution, which is subsequently dried and fired, such operations being repeated until a sufficient quantity of manganese dioxide is built up on the interior and exterior surfaces of the anode, as is well known to those versed in the art.

The following examples illustrate the invention but do not limit it.

EXAMPLE 1

A formation electrolyte is manufactured by adding 15.5 kilograms of boric acid crystals, C.P., to 27.5 kilograms of ethylene glycol (chloride-free reagent grade) over a period of about three minutes, after which 7.76 liters of 25% ammonium hydroxide, aqueous, are slowly admixed, with stirring, over a period of about eight minutes, all such mixings being conducted at room temperature. The mix is heated slowly for about 30 minutes to a temperature of 105° C., at which boiling occurs, and is heated further over a period of 30 minutes to 152° C. at which it is held or "cooked" for an additional 10 minutes, after which it is allowed to cool to room temperature (25° C.). The product made is an ethylene glycol borate and is converted to a useful formation electrolyte of this invention by dilution with distilled water to a concentration of about 2.5%, at which the pH is about 6.5 and the specific resistivity is about 80 ohm-cms.

Using a large glass laboratory cylinder as a static formation vessel, two aluminum foils, 1.5 inches by 18.4 inches, of a thickness of about 0.003 inch, set up as anode(s) and cathode(s) in the electrolyte at a temperature of 70° C. (circulating means and heating and cooling means are provided to hold 70° C.), are subjected to a direct current from a half wave rectifier without smoothing, at an applied voltage of 320 volts. The current is reversed 48 times per minute. Total formation takes 35 to 40 minutes to a final current of 6 milliamperes. The aluminum foils anodized are etched initially and contain the usual "air oxide" coating.

Upon completion of anodizing the foil is tested by conventional methods to measure build time, terminal voltage for 10 milliamperes leakage per square inch of anode, and capacitance. Foil samples so made are converted into test capacitors by rolling the anode foil along with a conventional cathode foil and paper after tabbing, impregnating with a standard fill electrolyte and sealing the cans. These test units are aged to rated voltage of 300 volts at room temperature for one hour and at 85° C. for one hour. It is noticed that build time and the time required for such healing and aging are about one-third those required for conventional foils. The characteristics of the test units are also measured.

The anodized metal made and the electrolytic capacitors produced from it are superior to such products made by the more conventional anodization methods in ways previously described. Specifically, capacitance is greater and leakage current is reduced. These are accomplished with lower power requirements and absences of cathode losses. In fact, the acid or reducing means generated at the cathode (or when an electrode is the cathode) apparently aids in improving the character of the oxide coating on the metal, perhaps by helping to remove hydrate, water, hydroxide and amorphous oxide therefrom. Furthermore, such accomplishments require no special exotic chemicals and the apparatus utilized may be readily produced, even being capable of being made by modification of present apparatuses.

When the described processes are effected with the apparatuses of FIGS. 1 and 2 to produce the capacitors of FIG. 3 the improvements due to current reversal are also obtained.

By following the present invention capacitors may be made from aluminum which have characteristics resembling those of capacitors presently made from tantalum by older techniques; thus, it is seen that the costs of manufacture and hence, the costs of condensers may be decreased.

When the procedures of the invention are repeated with tantalum foil and tantalum slugs, using dilute phosphoric or propionic acid as the formation electrolyte and with polarity reversal 48 to 60 times per minute, as compared to conventional direct current without reversal, comparable improvements over prior art techniques applied to tantalum are obtained. Also, when niobium slugs are anodized at 48 reversals per minute, an improved and more reproducible stable barrier oxide is obtained.

EXAMPLE 2

The procedure of Example 1 is repeated but instead of utilizing the ethylene glycol borate electrolyte, the electrolyte is a boric acid-borax type of the formula:

| | | |
|---|---|---|
| Borax | g | 42 |
| Boric acid | kg | 12.8 |
| Distilled water | l | 300 |

The resistivity of this electrolyte, which is above 3,000 ohm-cm. (compared to about 100 ohm-cm. for the preferred forming electrolyte of the present invention for aluminum), is diminished by the addition of 0.4% of boiled ethylene glycol borate made as described in Example 1, which lowers the resistivity to about 60 ohm-cm. Using this electrolyte, unboiled further, with the current reversal previously mentioned, the foil produced has an improved capacitance, being about 10% higher than is produced with the original electrolyte and without current reversal. Also, power consumption is reduced, compared to an anodizing process wherein current reversal is not used. Additional improvements are found when 60 Hz. ripple currents (5 to 20% ripple) are employed together with current reversal. Without reducing the resistivity of the original 3,000 ohm-cm. electrolyte, the only apparent advantage gained by polarity reversal is that scintillation voltage is increased.

EXAMPLE 3

When the procedure of Example 1 is followed using a static system or a continuous apparatus, as described, whether the electrode foils or sheets are coplanar or parallel, one atop the other or alongside each other and whether other shapes are formed, coatings are produced over the entire surfaces and are superior to those from conventional electrolytes or conventional uses of the improved electrolyte without current reversal.

EXAMPLE 4

When a formation electrolyte of the glycol borate type is manufactured according to the method described in Example 1 but with the temperature of heating being changed (from 150° C.) to various temperatures in the range of 120 to 190° C., diminutions in pH's of the diluted products with changes in such final pot temperatures are noted. These are charted below.

| Final pot temperature (° C.) | pH (10% of solution in water) |
|---|---|
| 120 | 7.6 |
| 130 | 7.6 |
| 140 | 7.4 |
| 150 | 7.1 |
| 160 | 6.8 |
| 170 | 6.1 |
| 180 | 5.4 |
| 190 | 4.3 |

When anodizing aluminum and employing glycol borate formation electrolytes containing about 3% of the glycol borates manufactured using the described final pot temperatures (1 to 5% may be used, preferably 2 to 4%), best anodizing and most desirable coatings of aluminum are noted when the electrolytes employed are those heated to from 150 to 190° C. (pH's neutral or acidic). Instead of heating to the elevated pot temperatures mentioned, similar effects are obtainable by heating to lower temperatures and utilizing vacuum. For example, heating to a final temperature of only 130 to 140° C. may be effected by operating at the corresponding vacuum to boil the solution. In any case, the specific resistivities of the diluted electrolytes will usually be below 100 ohm-cm. and preferably will be below 50 ohm-cm. The pH of the electrolyte will normally be within the 3 to 9 range, more preferably from 4 to 8.5.

EXAMPLE 5

Pieces of conventional unetched tantalum foil of a thickness of about 0.0005 inch and 1 inch square are anodized with a smooth D.C. current both conventionally and with polarity reversal at 48 reversals per minute. The D.C. current is controlled at 3 milliamperes until a terminal voltage of 200 volts is reached, which takes about one hour. Thereafter the voltage is controlled at 200 volts for about an additional 1½ hrs. and a final current of 0.05 milliampere is reached. The anodizing method followed is essentially that of Example 1 with the exception that the electrolyte is 4% propionic acid in distilled water, which results in a specific resistivity of about 100 ohm-cms. at room temperature.

After formation all samples give a terminal voltage between 202 and 205 volts at 10 microamperes leakage current. Capacitance measurements made with the anode foils in 34% sulfuric acid at 1,000 Hertz are 0.83 microfarad/sq. in. for the conventionally formed anodized tantalum foil and 0.95 microfarad/sq. in. for that formed while utilizing polarity reversal. Thus, a 14% improvement is obtained with the experimental product. Furthermore, since twice the amount of anode foil is produced by the polarity reversal process, power costs are also cut. (Power cost reductions obtained are more important for aluminum than tantalum but are not negligible in such latter case, either).

The interference colors of the anodized coatings are different for the conventional and experimental products, indicating differences in the antures of the oxides. That for the standard is pink, having a wave length of 660 microns, while the interference color for the experimental is blue-green, with a wave length of 535 microns.

When the experimental run is repeated but with 112 polarity reversals per minute the terminal voltage at 10 microamperes leakage current is 192 volts and the capacitance is 0.96 microfarad/sq. in. Thus, at this comparatively high current reversal frequency the workpiece does not reach full applied voltage, although the process represents an improvement over a control method. Applied voltage could be slightly increased to compensate for the higher reversal frequency.

When the same procedure is employed and low gain tantalum "C" size slugs are utilized at 48 reversals per minute, capacitance is 1.37 mfd. at 1,000 Hertz in 25% lithium chloride (a standard fill electrolyte), using a formation voltage of 200. The oxide color is green and the wave length is 535 microns. Contrasted to this, using slugs from the same batch at O reversals per minute the capacitance is 0.98 mfd. using a formation voltage of 200. The oxide color is red and its wavelength is 710 microns.

When niobium slugs are anodized, utilizing the same electrolyte and the same conditions except for formation voltage, which is maintained at 50, the capacitance is 4.33 mfd. at O reversals and the oxide is pink, of a wavelength of 730 microns, whereas at 48 reversals per minute the capacitance is 6.10 mfd. and the oxide color is green-purple, with a wavelength of 550 microns.

EXAMPLE 6

Following the procedure of Example 1, utilizing a 3% aqueous glycol borate solution in which the glycol borate is made by cooking to about 150° C., anodized coatings are deposited on aluminum foil electrodes by a plurality of methods, utilizing different current reversal frequencies. Capacitances and power consumptions are measured and recorded. The following data are obtained.

| Reversals per minute | Mfd./ sq. in.[1] | Watt-hrs. per anode (1.5 by 18.4 inches) |
|---|---|---|
| 0 | 2.5 | 258 |
| 2 | 2.4 | 267 |
| 10 | 2.7 | 240 |
| 20 | 2.9 | 227 |
| 40 | 2.95 | 195 |
| 48 | 2.9 | 210 |
| 64 | 2.95 | 210 |
| 100 | 3.1 | 224 |
| 112 | 2.9 | 295 |
| 136 | ([2]) | 340 |

[1] At 1,000 Hertz after aging to 320 volts.
[2] Incomplete film (would not age up to 320 volts).

In a similar manner utilizing the same 3% glycol borate but cooking it to 190° C., employing 48 current reversals per minute, one obtains 3.1 microfarads/sq. in. and consumes 230 watt hours per anode. Similarly useful results are obtainable when cooking is in the range of 160–180° C.

When employing a conventional 4% boric acid electrolyte without current reversal 434 watt hours are required and the anodized dielectric produced is rated at 2.30 microfarads/sq. in. With such electrolyte and current reversal to the extent of 48 reversals per minute, the capacitance drops to 2.15 and the watt-hours consumed are 450. When 0.4% of glycol borate is added to the electrolyte and pH is at about 6–7, specific resistivity of the electrolyte drops and improved capacitance and diminished power consumption result.

EXAMPLE 7

Titanium is anodized by treating a commercially pure sheet (MIL–T–9046, Type 1), 0.012 inch thick and 1 inch square, unetched, by the method of Example 1, utilizing as an electrolyte 4% propionic acid (100 ohm-cms. specific resistivity), at a formation potential of 12 volts. When no current reversal is employed the capacitance of the oxide produced is 15.1 mfd. (at 1,000 Hertz in 25% lithium chloride) and the oxide color is red-violet, of a wavelength of 750 microns. The oxide is not stable with respect to leakage current. However, when 48 current reversals per minute are utilized the capacitance increases to 28.4 mfd. and the oxide produced, which is yellow and of a wavelength of 580 microns, is stable with respect to leakage current.

EXAMPLE 8

A stainless steel specimen is subjected to anodizing by the method of Example 1, using a potassium hydroxide (5%) electrolyte. The production of oxide coatings of various colors on the stainless steel is observed, said colors having both decorative and functional effects. The color differences, ranging from straw to blue, are obtainable depending on the frequency of current reversals, the time of anodizing and the applied voltage.

The invention has been described with respect to specific examples and illustrations thereof but, as will be evident to one of skill in the art, it is not to be limited to these because it is evident that equivalents and substitutes may be employed. Also, one of skill in the art will recognize the desirability of utilizing particular formation voltages for the various metals within the 10 to 600 volt range, employing preferred electrolytes and reversing the current direction within the 10 to 130 reversals per minute, preferably 20 to 110 reversals per minute ranges, so as to obtain optimum anodizing effects for the purposes intended.

What is claimed is:

1. A method of anodizing a metal which comprises passing an electric current through such metal while it is an electrode in an electrolyte and reversing the direction of such current flow from 10 to 130 times per minute.

2. A method according to claim 1 wherein the metal being anodized is aluminum or other valve metal, the electrolyte is an aqueous liquid and the current reversal is effected from about 20 to 110 times per minute.

3. A method according to claim 2 wherein the metal being anodized is aluminum, tantalum, titanium or niobium, the electrolyte is a dilute aqueous solution of an electrolyte salt and/or acid and the metal is coated with a film of the metal oxide during anodizing.

4. A method according to claim 3 wherein the voltage applied is from about 10 to 600 volts, the concentration of electrolyte salt or salts in the aqueous electrolyte is from 1 to 15%, the pH of the electrolyte is from 3 to 9 and the anodizing time is about 30 to 120 minutes.

5. A method according to claim 4 wherein the metal being anodized is aluminum or tantalum in foil form, a pair of such foils is present and the foils act alternately as anodes and cathodes in an anode-cathode pair.

6. A method according to claim 5 wherein a D.C. voltage with over 3% and less than 30% rippled voltage is impressed between the electrodes.

7. A method according to claim 6 wherein the metal foils are of aluminum, the electrolyte is a dilute aqueous glycol borate, and the ripple voltage is that obtained from half wave rectification without smoothing.

8. A method according to claim 7 wherein the glycol borate of the electrolyte is that resulting from reacting 1.5 to 1.9 moles of ethylene glycol with one mole of boric acid in the presence of an aqueous solution of ammonium hydroxide and heating to a temperature of at least 150° C.

9. A method according to claim 2 wherein the metal being anodized is in foil form, a pair of such foils is present and the foils act alternately as anodes and cathodes in an anode-cathode pair.

10. A method according to claim 2 wherein a ripple voltage is impressed on the anode which improves the formation of the anodized coating on the metal.

11. A method according to claim 2 wherein the metal being anodized is aluminum initially containing surface "air oxide" thereon and the electrolyte is an aqueous solution of ethylene glycol borate at a concentration of about 1 to 5%.

12. A method according to claim 11 wherein the glycol borate of the electrolyte is that resulting from reacting about 1.5 to 1.9 moles of ethylene glycol with one mole of boric acid in the presence of an aqueous solution of ammonium hydroxide and heating to a temperature of at least 150° C., and the concentration thereof is 1 to 5%.

13. A method according to claim 1 wherein the metal is titanium.

14. A method according to claim 13 wherein the anodized coating is a titanium oxide stable with respect to leakage current.

15. A method according to claim 1 wherein the metal is stainless steel.

16. A method of anodizing metal which comprises moving through an anodizing bath a plurality of metal pieces which are alternately anodic and cathodic and in which current direction flow is changed 10 to 130 times every minute.

17. A method according to claim 16 wherein the pieces are foil strips which are coplanar and repeatedly enter into and exit from a dilute aqueous anodizing electrolyte until a coating of metal oxide is formed on the surfaces thereof.

18. A method of anodizing a metal which comprises passing a direct electric current through it while it is an electrode in an electrolyte and reversing the direction of the current flow from 10 to 130 times per minute so as to improve the deposition of the anodized oxide coating, and continuing such reversals regularly until a satisfactory anodized coating is produced.

19. A method according to claim 1 wherein the current flow in one direction is from 40 to 60% of the total current flow.

20. A method according to claim 1 wherein the anodized metal is incorporated in a capacitor, with oxide film produced by the anodizing being a dielectric thereof, and the oxide film is aged to rated capacitor voltage.

21. A formation electrolyte for the manufacture of anodized metal which comprises a dilute aqueous solution of ethylene glycol borate, free of gums and thickeners and at a pH of 4 to 8.5.

22. A method of making a formation electrolyte of a pH of about 4 to 8.5, free of gums and thickeners and suitable for use in the anodizing of aluminum foil, which comprises reacting boric acid and ethylene glycol in the presence of ammonium hydroxide, heating the product to an elevated temperature of over 150° C. and diluting with water.

23. A method according to claim 22 which comprises reacting about one molar proportion of boric acid and 1.5 to 1.9 molar proportions of ethylene glycol, admixing with such materials from 10 to 30% of aqueous ammonium hydroxide containing from 15 to 30% of ammonium hydroxide, heating the mixture to a temperature of about 150 to 200° C., above the initial boiling temperature, holding it at such temperature for a period of five to twenty minutes and diluting with water to a concentration of about 1 to 5% ethylene glycol borate.

References Cited

UNITED STATES PATENTS

| | | | |
|---|---|---|---|
| 3,658,662 | 4/1972 | Casson et al. | 204—28 |
| 2,951,025 | 8/1960 | Mostovych et al. | 204—211 |
| 2,901,412 | 8/1959 | Mostovych et al. | 204—211 |
| 2,930,951 | 3/1960 | Burger et al. | 204—38 A |
| 3,321,678 | 5/1967 | Dakin et al. | 204—38 A |
| 3,190,819 | 6/1965 | Maissel et al. | 204—38 |

T. M. TUFARIELLO, Primary Examiner

U.S. Cl. X.R.

204—38 A, 58